No. 780,340. Patented January 17, 1905.

UNITED STATES PATENT OFFICE.

MAURICE HÉRISSON, OF PARIS, FRANCE.

OIL-PAINT.

SPECIFICATION forming part of Letters Patent No. 780,340, dated January 17, 1905.

Application filed June 30, 1904. Serial No. 214,796.

*To all whom it may concern:*

Be it known that I, MAURICE HÉRISSON, merchant, a citizen of the Republic of France, residing at 8 Rue du Sentier, Paris, in the Republic of France, have invented certain new and useful Improvements in the Manufacture of Oil-Colors, of which the following is a specification.

This invention relates to improvements in the manufacture of oil-colors, more particularly in view of obtaining a white color or paint which is inalterable in air and in water, salubrious to use, covering well the surfaces, of a smooth aspect, mixing with any and every color without changing the tints, and doing away with minium for painting on iron. The preferred composition of the said color is as follows: silicate of baryta, twenty parts, by weight; hydrated silica, five parts, by weight; infusorial earth, eighteen parts, by weight; precipitated alumina, ten parts, by weight; pure kaolin, five parts, by weight; oxid of zinc, twenty parts, by weight; linseed-oil, twenty-two parts, by weight. Total, one hundred.

The silicate of baryta is prepared in a state of great pureness by reaction of the barium chlorid on the silicate of soda.

The given quantities of precipitated alumina, of hydrated silica, and of infusorial earth are mixed with water heated up to 50° centigrade, filtered and dried. The product thus obtained and the silicate of baryta are crushed and mixed with the kaolin, the oxid of zinc, and the linseed-oil. In this compound the fundamental element of the color is the silicate of baryta, which gives it its solidity, its inalterability, and its other good qualities. This compound is cheap to manufacture, and it has also the advantage of being very fine, very soft, and of giving a perfectly smooth painting. The hydrated silica plays the part of an agglutinous or fixing body to combine the several elements of the mixture. The infusorial earth gives to the painting the property of covering well. The kaolin gives consistence and acts especially as a drier. The precipitated alumina is necessary to keep the oxid of zinc in a suitable state. It probably acts as a mordant with respect to the oxid of zinc.

Of course the proportions given above may be modified in increasing or decreasing the same for each substance. Several secondary changes may also be made in the nature of the substances used. For instance, instead of infusorial earth another covering-body, such as kaolin, &c., may be used. According to requirements also there may be added to the paint a greater or less proportion of drying matter, as usual. The painting may be rendered either dull or brilliant at will.

I claim—

1. An oil-color paint containing silicate of baryta, oxid of zinc, precipitated alumina and linseed-oil.

2. An oil-color paint, comprising silicate of baryta, zinc oxid, precipitated alumina, infusorial earth, kaolin and hydrated silica.

3. An oil-color paint, comprising silicate of baryta, hydrate of silica, infusorial earth, precipitated alumina, kaolin, zinc oxid and linseed-oil.

4. An oil-color paint, comprising, by weight, silicate of baryta, twenty parts, hydrated silica, five parts, infusorial earth, eighteen parts, precipitated alumina, ten parts, pure kaolin, five parts, zinc oxid, twenty parts, and linseed-oil, twenty-two parts.

In testimony that I claim the foregoing as my invention I have signed my name in presence of two subscribing witnesses.

MAURICE HÉRISSON.

Witnesses:
HANSON C. CORCE,
BLÉTRY EDMOND.